(12) United States Patent
Kobayashi

(10) Patent No.: US 8,976,408 B2
(45) Date of Patent: Mar. 10, 2015

(54) APPARATUS, METHOD, AND COMPUTER-READABLE STORAGE MEDIUM FOR MAINTAINING REPRODUCIBILITY OF LINES OR CHARACTERS OF IMAGE

(71) Applicant: Canon Kabushiki Kaisha, Tokyo (JP)

(72) Inventor: Masato Kobayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 54 days.

(21) Appl. No.: 13/710,252

(22) Filed: Dec. 10, 2012

(65) Prior Publication Data

US 2013/0148133 A1    Jun. 13, 2013

(30) Foreign Application Priority Data

Dec. 13, 2011 (JP) ................. 2011-272165

(51) Int. Cl.
*G06K 15/02* (2006.01)
*G06T 5/00* (2006.01)
*G06T 5/30* (2006.01)

(52) U.S. Cl.
CPC ............ *G06K 15/1872* (2013.01); *G06T 5/003* (2013.01); *G06T 5/30* (2013.01)
USPC .......................................... 358/1.2; 358/3.06

(58) Field of Classification Search
USPC ................................. 358/1.2, 3.06
See application file for complete search history.

(56) References Cited

U.S. PATENT DOCUMENTS

2011/0273746 A1 * 11/2011 Hoshino et al. .............. 358/3.06

FOREIGN PATENT DOCUMENTS

JP          10-313410 A    11/1998

* cited by examiner

*Primary Examiner* — Qian Yang
(74) *Attorney, Agent, or Firm* — Canon USA Inc IP Division

(57) ABSTRACT

An image processing apparatus includes a setting unit configured to set two pixels, one of which is adjacent to a processing target pixel in a vertical direction and the other of which is adjacent to the processing target pixel in a horizontal direction, as first determination pixels, and to set two pixels adjacent to and opposite across one of the two first determination pixels, as second determination pixels, and an output unit configured to output a black pixel for the processing target pixel, in a case where one of the first determination pixels is a black pixel and one of the second determination pixels is a black pixel.

15 Claims, 20 Drawing Sheets

△ : TARGET PIXEL
☐ : FIRST DETERMINATION PIXEL
◎ : SECOND DETERMINATION PIXEL

△ : TARGET PIXEL
☐ : FIRST DETERMINATION PIXEL

△ : TARGET PIXEL
☐ : FIRST DETERMINATION PIXEL
◎ : SECOND DETERMINATION PIXEL

FIG. 8

| FIRST DETERMINATION PIXEL | SECOND DETERMINATION PIXEL | TARGET PIXEL | LINE WIDTH CORRECTION |
|---|---|---|---|
| ○ | ○ | ○ | NOT PERFORMED |
| ○ | ○ | × | PERFORMED |
| ○ | × | ○ | NOT PERFORMED |
| ○ | × | × | NOT PERFORMED |
| × | ○ | ○ | NOT PERFORMED |
| × | ○ | × | NOT PERFORMED |
| × | × | ○ | NOT PERFORMED |
| × | × | × | NOT PERFORMED |

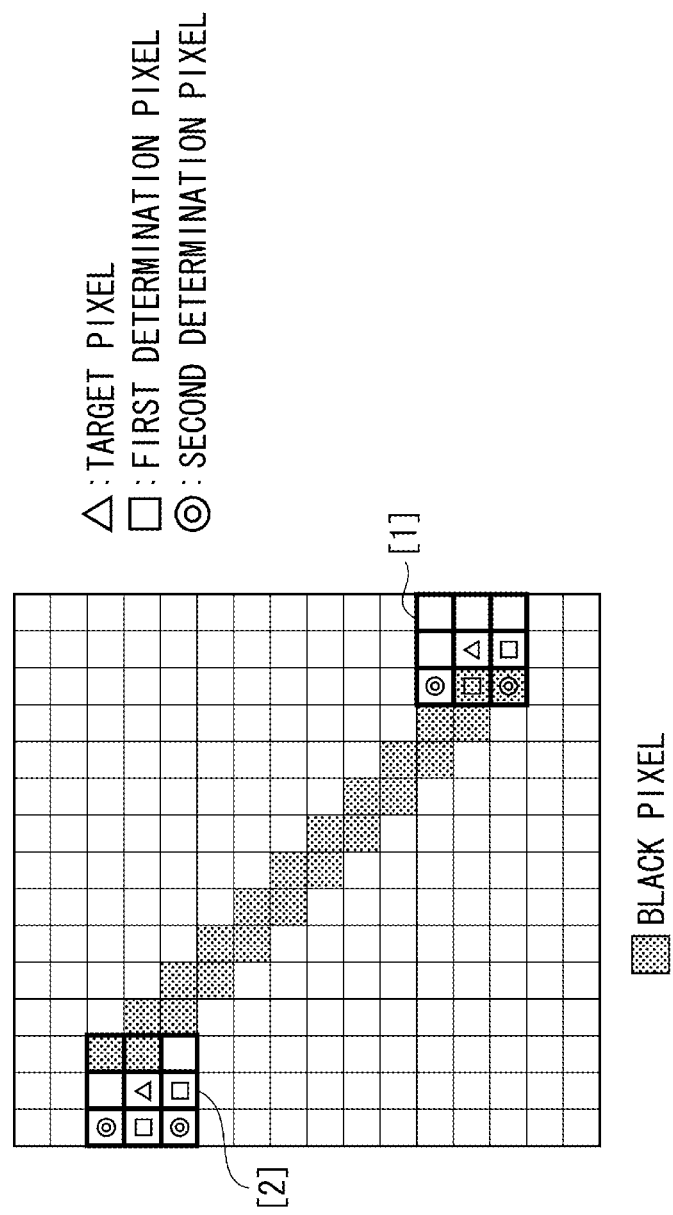

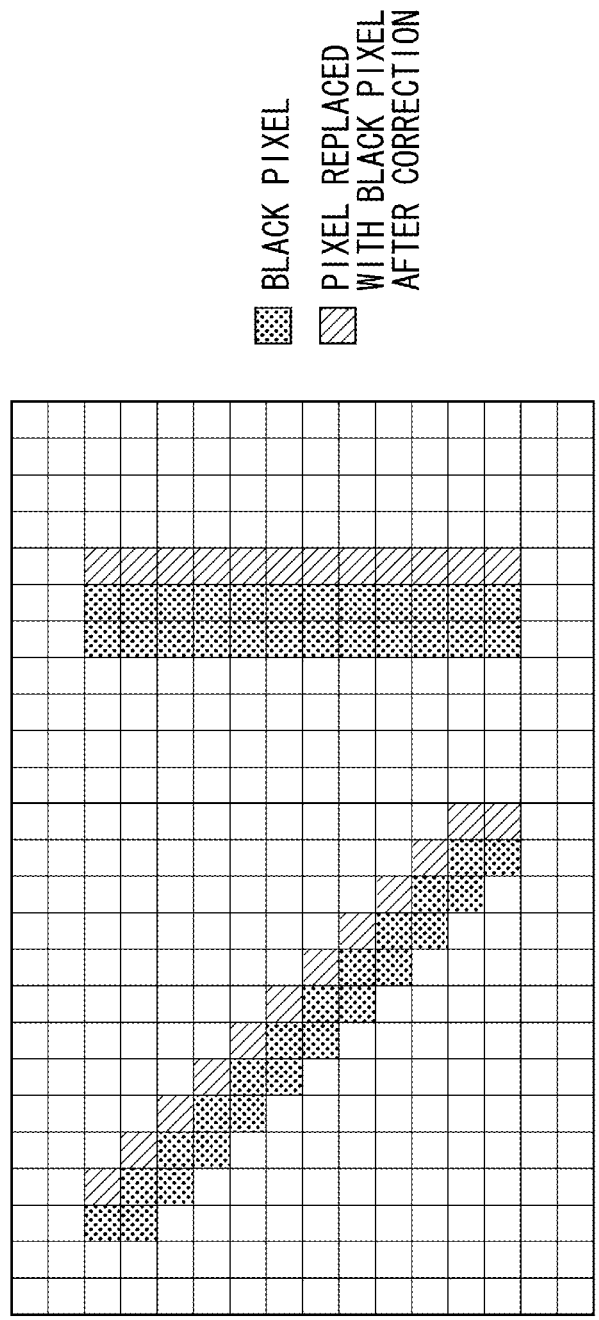

△: TARGET PIXEL
☐: FIRST DETERMINATION PIXEL
◆: BLANK PIXEL DETERMINATION PIXEL

△: TARGET PIXEL
☐: FIRST DETERMINATION PIXEL
◆: BLANK PIXEL DETERMINATION PIXEL

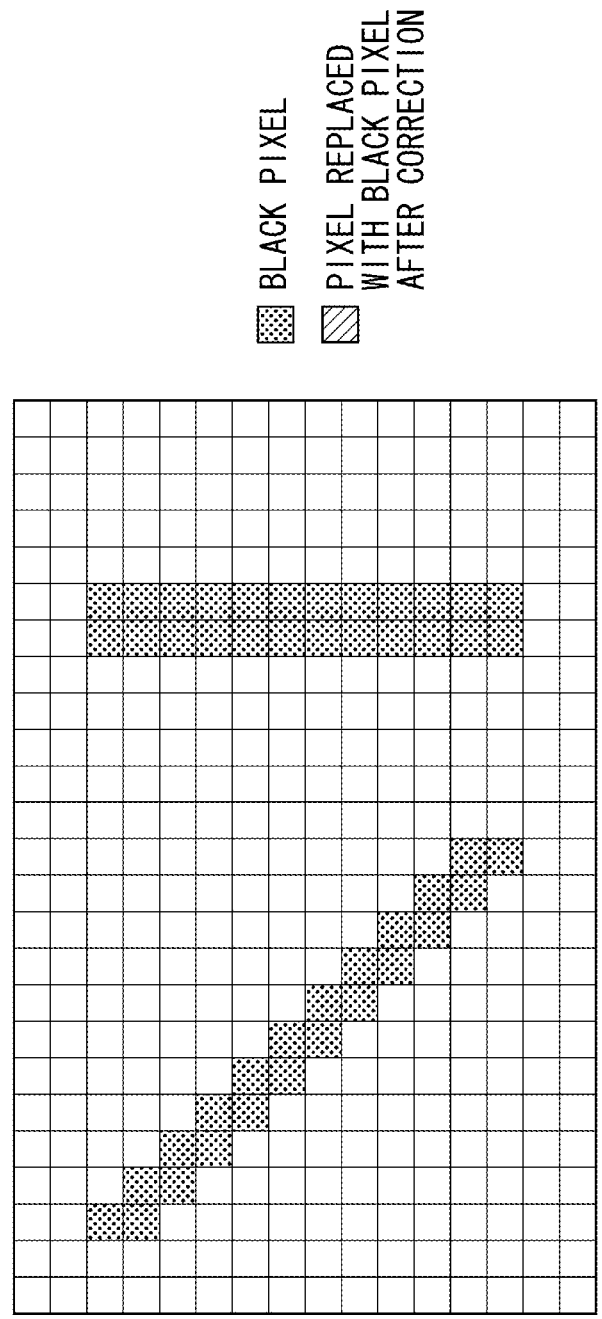

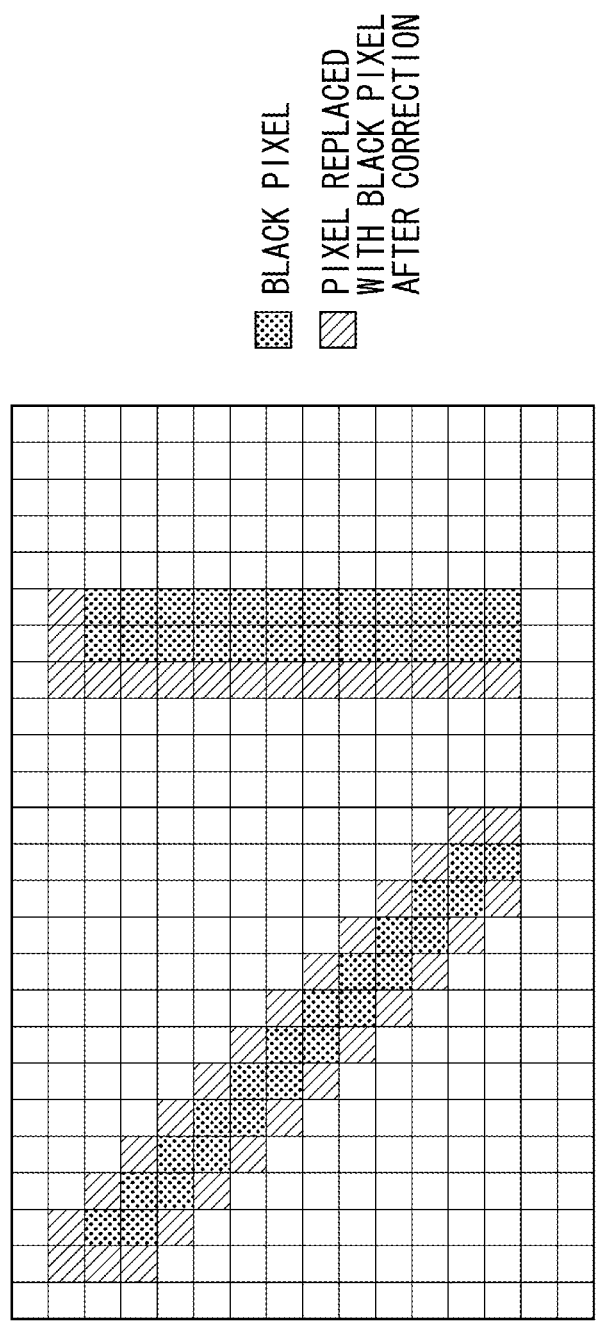

APPARATUS, METHOD, AND COMPUTER-READABLE STORAGE MEDIUM FOR MAINTAINING REPRODUCIBILITY OF LINES OR CHARACTERS OF IMAGE

BACKGROUND OF THE INVENTION

1. Field of the Invention

The present invention relates to a technology for thickening an image to be printed.

2. Description of the Related Art

With an increase in a print resolution, a printing apparatus can perform printing more finely. Therefore, reproducibility of lines or characters of images become more important. However, the reproducibility of lines or characters may be changed due to a use environment or long-term use of a printing apparatus, and thus the lines or characters may be printed more thinly than the original thickness thereof in some cases. When the lines or characters become thin, the impression of a print product is considerably changed. Therefore, it is important to maintain the reproducibility of the lines or characters. Japanese Patent Application Laid-Open No. 10-313410 discusses an image processing method for thickening lines or characters on a print product by performing correction so that pixels adjacent to a black pixel, which is a target pixel, are substituted with black pixels to thicken an image before printing. In the method discussed in Japanese Patent Application Laid-Open No. 10-313410, however, a correction amount may be different depending on the angle of an element included in a line or character in the image. Specifically, as in FIGS. 15A and 15B, elements of graphics "\" and "|" are corrected, and thus correction amounts in the right and left directions of the graphics are seen. In this case, the correction amount (thickening amount) for the element of "|" is for one pixel substituted with a black pixel, but the correction amount for the element of "\" is for two pixels substituted with two black pixels. Thus, the amounts for thickening an image are different from each other.

SUMMARY OF THE INVENTION

According to the aspect of the present invention, an image processing apparatus includes a setting unit configured to set two pixels, one of which is adjacent to a processing target pixel in a vertical direction and the other of which is adjacent to the processing target pixel in a horizontal direction, as first determination pixels, and to set two pixels adjacent to and opposite across one of the two first determination pixels, as second determination pixels, and an output unit configured to output a black pixel for the processing target pixel, in a case where one of the first determination pixels is a black pixel and one of the second determination pixels is a black pixel.

According to an exemplary embodiment of the invention, an image can be corrected by suppressing a variation in the correction amount depending on the angle of an element of an image to be corrected.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 is a diagram illustrating conditions for the line width correcting process according to the first exemplary embodiment.

FIG. 9 is a diagram illustrating an example of determination using a correction filter according to the first exemplary embodiment.

FIGS. 10A and 10B are diagrams illustrating a state of the line width correcting process according to the first exemplary embodiment.

FIGS. 15A and 15B are diagrams illustrating a line width correcting process according to the conventional technology.

DESCRIPTION OF THE EMBODIMENTS

Various exemplary embodiments, features, and aspects of the invention will be described in detail below with reference to the drawings.

Figure 1:
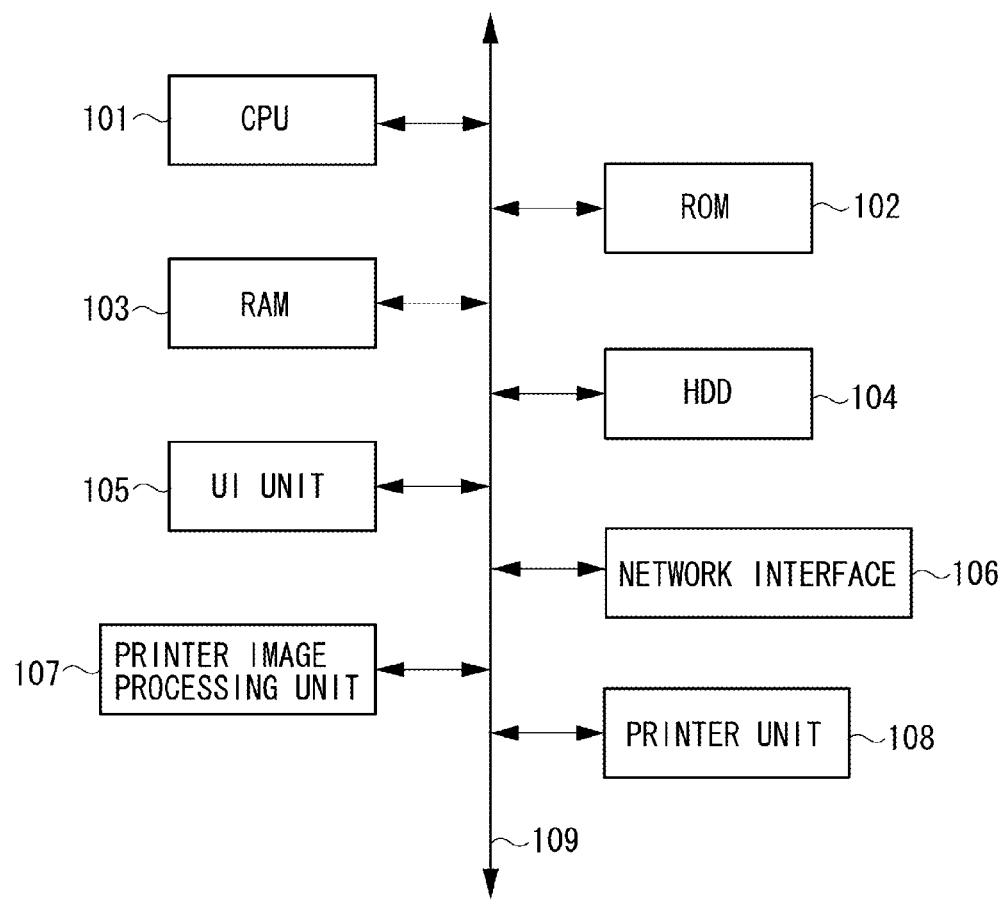
FIG. 1 is a system block diagram illustrating the configuration of an image processing apparatus according to a first exemplary embodiment of the present invention.

FIG. 1 is a system block diagram illustrating a basic hardware configuration of an image processing apparatus according to a first exemplary embodiment of the invention. Color or monochrome image processing apparatuses such as a digital copying machine, a laser printer in which a separate scanner is prepared, or a facsimile employing an electrophotographic method may be used as the image processing apparatus according to the exemplary embodiment. The image processing apparatus according to the exemplary embodiment includes a central processing unit (CPU) 101, a read only memory (ROM) 102, a random access memory (RAM) 103, a hard disk drive (HDD) 104, a user interface (UI) unit 105, a network interface (I/F) 106, a printer image processing unit 107, a printer unit 108, and a system bus 109.

The CPU 101 is configured to control the entire image processing apparatus and perform arithmetic processing or the like. The CPU 101 executes a process of each unit to be described below based on a program stored in the ROM 102.

The ROM 102 includes a storage region storing a system activation program or a program for controlling a printer engine and information about character data or character codes.

The RAM 103 is used by the CPU 101, when a program or data is loaded and executed in each of various processes in a data storage region with no use limitation. Further, the RAM 103 is used as a data storage region of an input image file.

The HDD 104 includes, for example, a hard disk, and the like, and is used as a region for storing a program, each information file, a print image, or the like or a working region.

Figure 6:
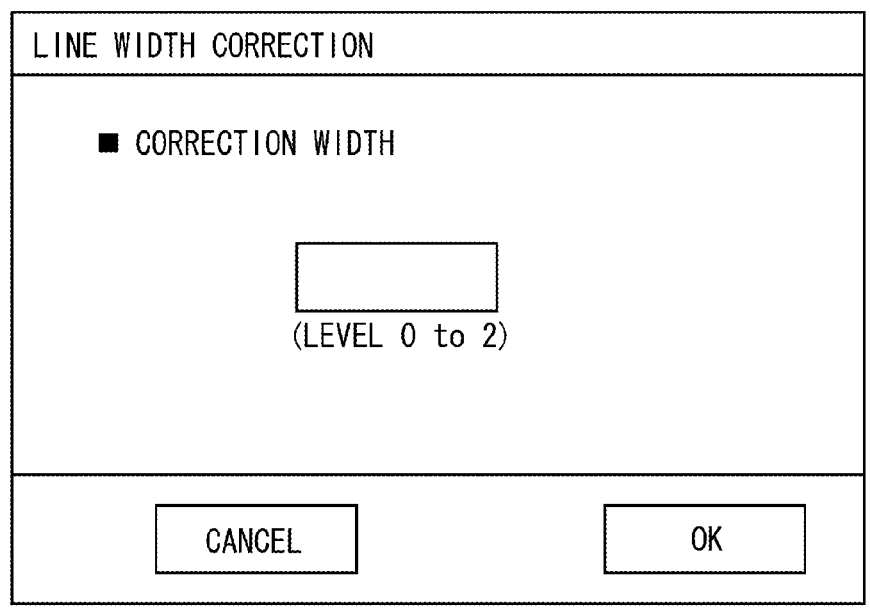
FIG. 6 is a diagram illustrating a correction width setting screen for a line width correcting process according to the first exemplary embodiment.

The UI unit 105 displays information for a user by, for example, a liquid crystal and is a user interface used to display an apparatus setting state, a current apparatus internal process, an error state, or the like. The UI unit 105 is also a user interface that is used for a user to input various instructions such as setting, change, and reset of a setting value. Specifically, the UI unit 105 displays a correction width setting screen for line width correcting process illustrated in FIG. 6 and stores information about a correction width of the line width correcting process input by the user as a setting value in the HDD 104.

The image processing apparatus is connected to a network via the network I/F 106. The network I/F 106 outputs page description language (PDL) data from an information processing terminal such as a personal computer (PC) (not illustrated) connected via a network to the printer image processing unit 107.

The printer image processing unit 107 performs desired image processing suitable for a printer on the PDL data input via the network I/F 106. The configuration of the printer image processing unit will be described below with reference to FIG. 2. The printer image processing unit 107 outputs image data subjected to the image processing to the printer unit 108.

The printer unit 108 forms (prints) an image on a sheet conveyed through electrophotographic processes such as exposure, latency, developing, transferring, and fixing based on image data processed by the printer image processing unit 107.

The system bus 109 connects the above-described constituent elements to each other to serve as a data path between the constituent elements.

Figure 2:
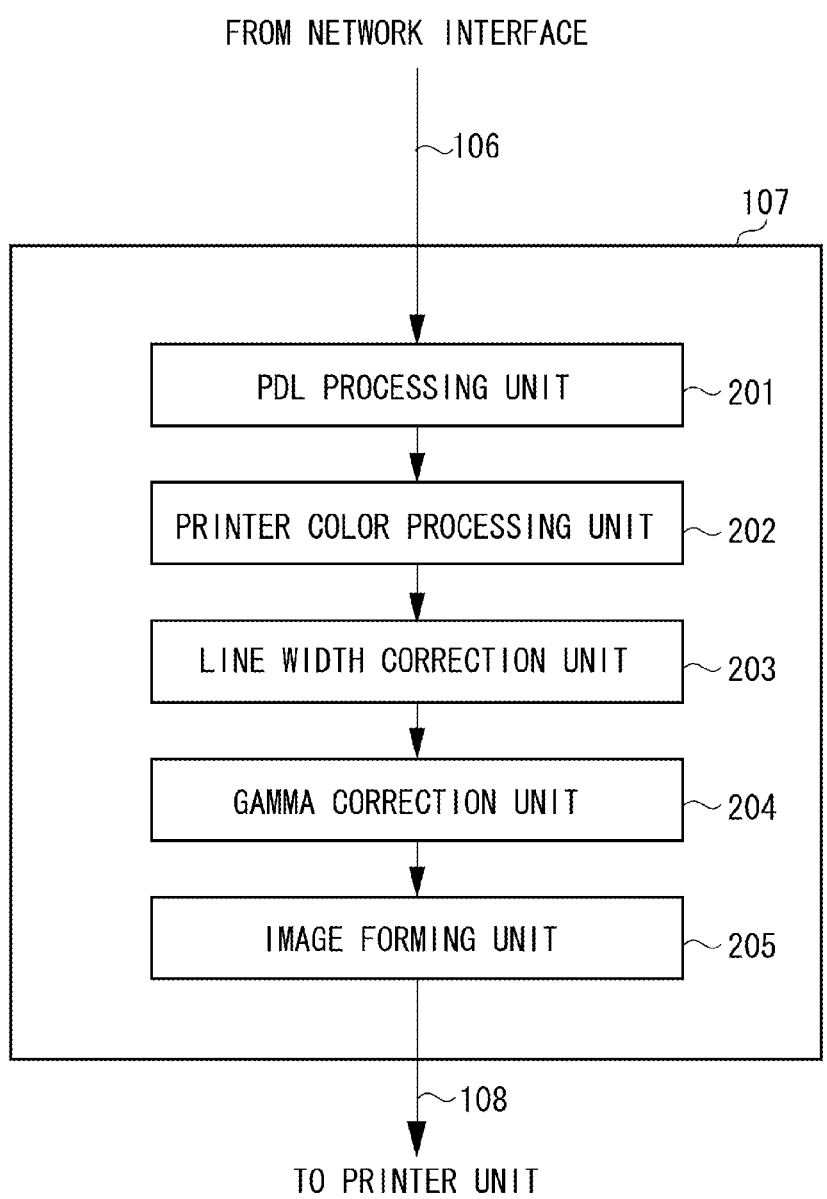
FIG. 2 is a block diagram illustrating the configuration of a printer image processing unit according to the first exemplary embodiment.

FIG. 2 is a block diagram illustrating the configuration of the printer image processing unit 107 according to the exemplary embodiment. The printer image processing unit 107 according to the exemplary embodiment includes a PDL processing unit 201, a printer color processing unit 202, a line width correction unit 203, a gamma correction unit 204, and an image forming unit 205.

The PDL processing unit 201 interprets the PDL data input via the network I/F 106. Thus, the PDL processing unit 201 performs color conversion using a color management module (CMM), generates red-green-blue (RGB) image data with a bitmap format through rasterizing, and generates attribute data (a character, a graphic, or a photo) indicating an object. The PDL processing unit 201 performs a process for rotating the RGB image data to generate rotation direction data (rotation information) indicating the degree of rotation. Each processed data is output to the printer color processing unit 202.

The printer color processing unit 202 performs a color converting process on the input RGB image data to generate cyan-magenta-yellow-black (CMYK) image data suitable for a printer. Each data including the processed image data is output to the line width correction unit 203.

Figure 3:
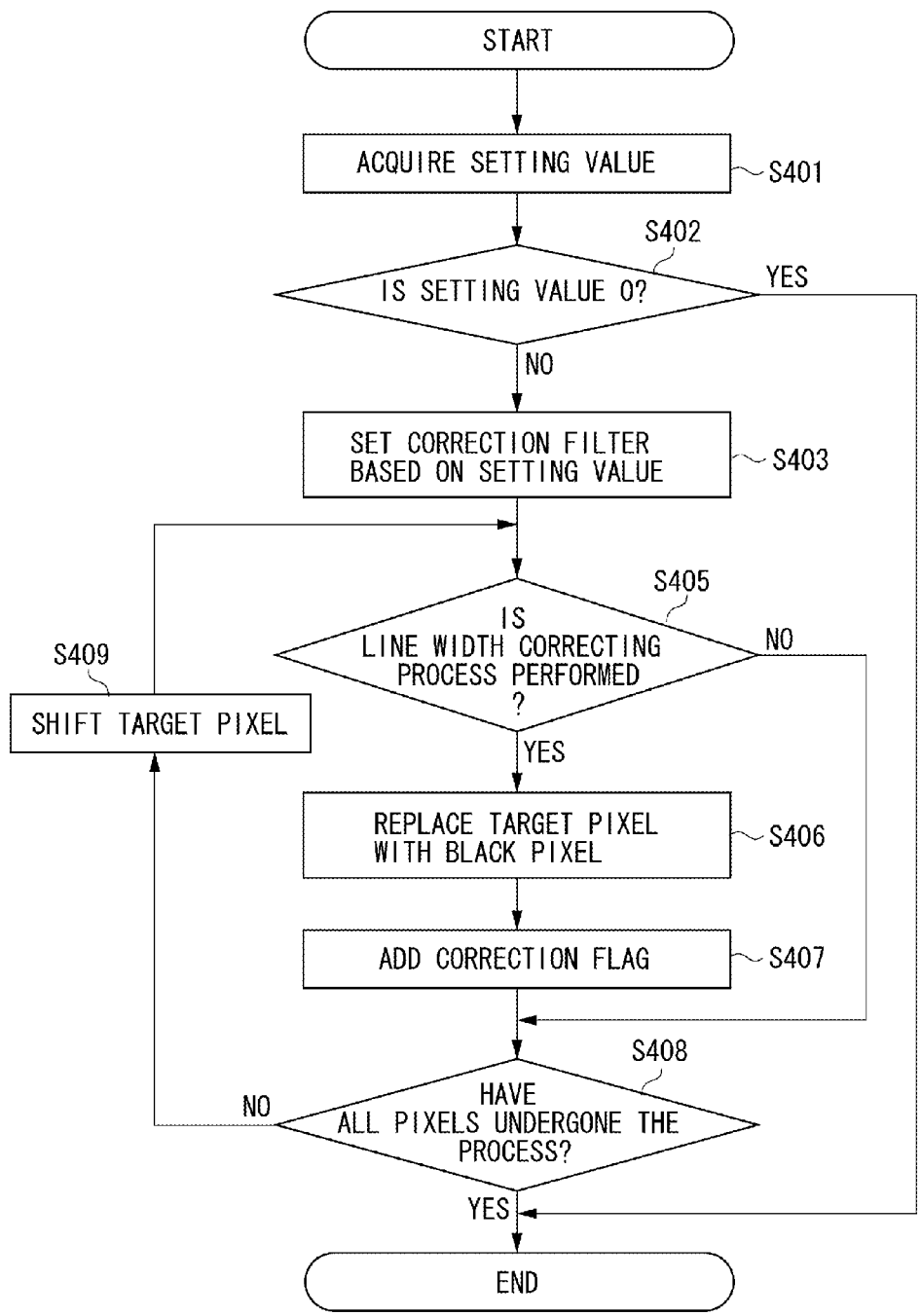
FIG. 3 is a flowchart illustrating a processing procedure of a line width correction unit according to the first exemplary embodiment.
Figure 4:
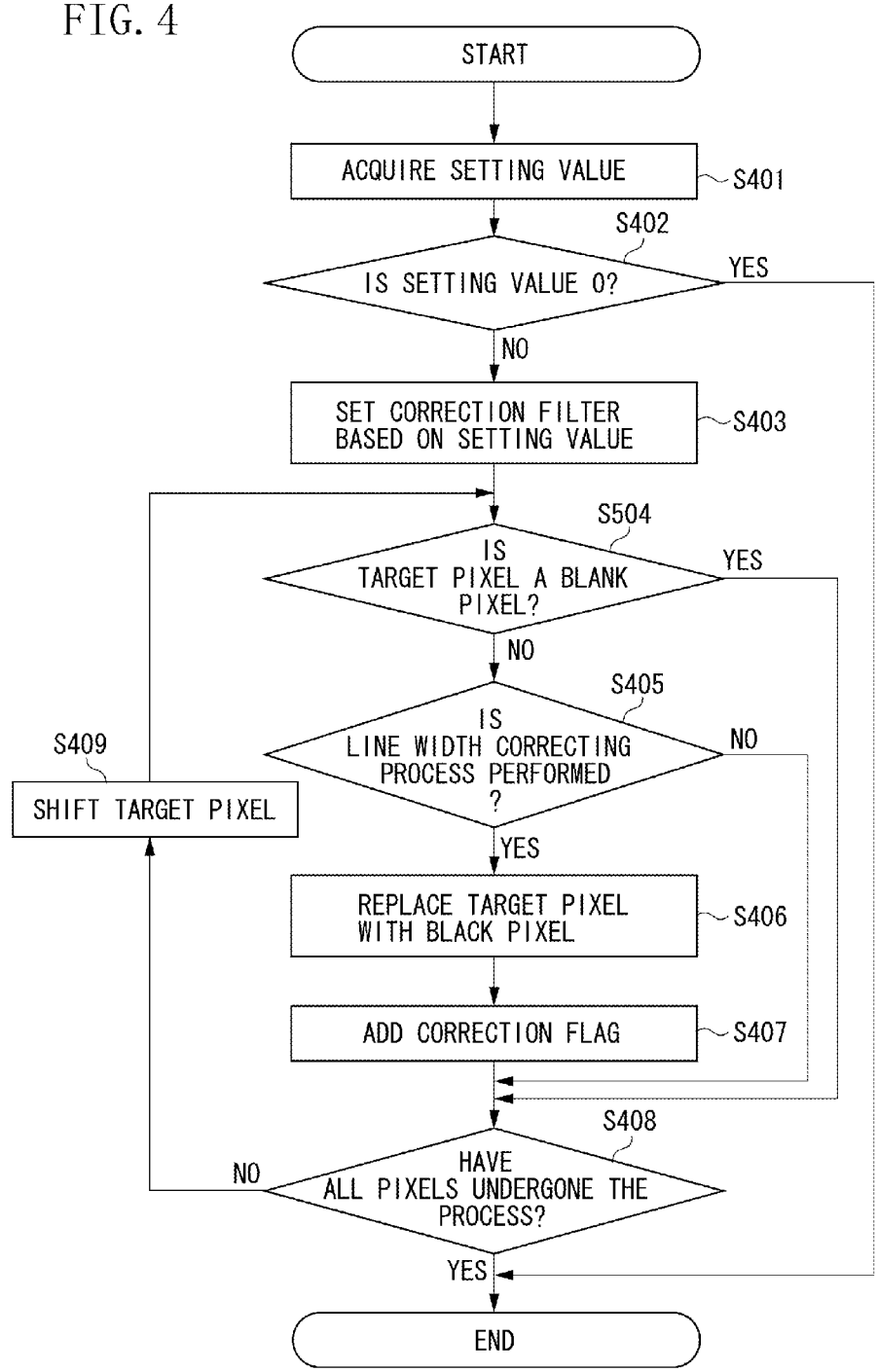
FIG. 4 is a flowchart illustrating a processing procedure of a line width correction unit according to a second exemplary embodiment of the invention.
Figure 5:
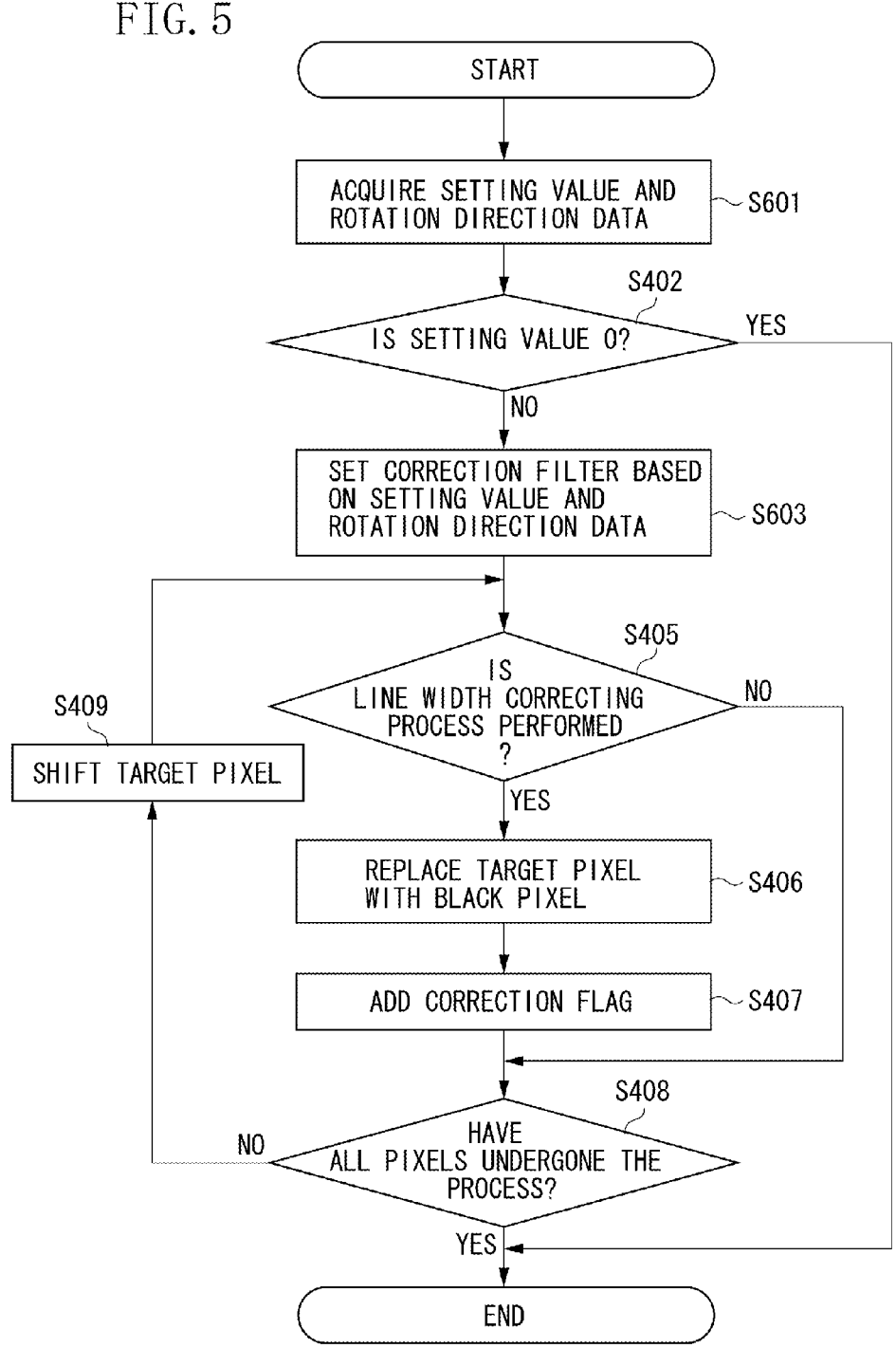
FIG. 5 is a flowchart illustrating a processing procedure of a line width correction unit according to a third exemplary embodiment of the invention.

The line width correction unit 203 performs a process (line width correcting process) for adding multi-value pixels to the input CMYK image data and thickening an image by executing the process in the flowchart illustrated in FIG. 3, 4, or 5. The processed image data is output to the gamma correction unit 204.

The gamma correction unit 204 performs a correcting process on the input CMYK image data to constantly maintain gradation characteristics of the printer unit 108. The processed image data is output to the image forming unit 205.

The image forming unit 205 converts the input CMYK image data into a halftone image with N (integer) bits suitable for the printer and outputs the halftone image to the printer unit 108.

FIG. 3 is a flowchart illustrating a series of processes performed by the line width correction unit 203. The following processes are assumed to be performed on all pixels of the image data.

In step S401, the line width correction unit 203 acquires a setting value (a setting value for a correction width in FIG. 6), which is set based on a user's instruction from the HDD 104 via the UI unit 105. In the exemplary embodiment, for example, if the setting value is "0," the line width correcting process is not performed. If the setting value is "1," the line width correcting process is performed to thicken an image by one pixel. If the setting value is "2," the line width correcting process is performed to thicken an image by two pixels.

In step S402, the line width correction unit 203 determines whether the setting value acquired in step S401 is "0." If the setting value is "0," the line width correcting process ends.

If the setting value is not "0,", then in step S403, the line width correction unit 203 sets a correction filter based on the setting value. In other words, the line width correction unit 203 sets first and second determination pixels for a target pixel, which is a processing target pixel of the line width correcting process.

In the exemplary embodiment, the process for correcting the target pixel is performed using, for example, a correction filter of 3×3 pixels. In the correcting process, if the setting value is "1," correction (with a black pixel) corresponding to one pixel is performed. If the setting value is "2," correction (with two black pixels) corresponding to two pixels is performed. That is, the setting value input based on the user's instruction and stored in the HDD 104 functions as control information for controlling the extent where the pixel replacement with black pixels in an image is performed. Thus, the setting value "1" functions as first information. The setting value "2" functions as second information indicating that the pixel replacement with black pixels is performed to the greater extent than the first information.

Figure 7A:
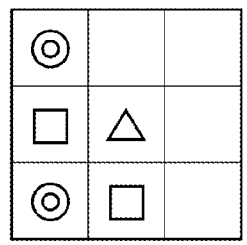
FIGS. 7A, 7B, and 7C are diagrams illustrating correction filters according to the first exemplary embodiment.

In the setting of the correction filter when the setting value is "1," as illustrated in FIG. 7A, a pixel located below the target pixel (Δ) by one pixel and a pixel located to the left of the target pixel (Δ) by one pixel are the first determination pixels (□). In addition, a pixel located left below the target pixel (Δ) by one pixel and a pixel located left above the target pixel (Δ) by one pixel are the second determination pixel (◉). The correction filter when the setting value is "1" will be described in more detail below.

Figure 7B:
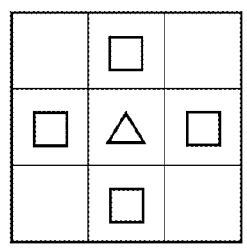

When the setting value is "2" in the setting of the correction filter, as illustrated in FIG. 7B, four pixels located above, below, to the left, and to the right of the target pixel (Δ) are the first determination pixels (□). The second determination pixel is not set. The reason why the second determination pixel is not set when the setting value is "2" is that the correction can be performed with uniform correction width with irrespective of the angles of the elements even when the second determination pixel is not set.

In step S405, the line width correction unit 203 determines whether the line width correcting process is performed by referring to pixel data of the first and second determination pixels, pixel data of the target pixel, and a correction flag. The correction flag is added to a pixel on which the line width correcting process has already been performed. A specific determining method will be described below.

Hereinafter, in the first and second determination pixels, when the pixel density is 100% (black pixel), the expression of "the pixel is O" is used. When the pixel density is less than 100%, the expression of "the pixel is x" is used. Further, in the target pixel, when the pixel density is 100% (black pixel) or the correction flag is added, the expression of "the pixel is O" is used. In the other cases, the expression of "the pixel is x" is used. When the density is 100%, this indicates that a density value is 255, if a pixel has density values in the range of 0 to 255. In an alternative embodiment of the present invention, a pixel is considered a black pixel when the density is less than 100% but above a threshold. The present invention may also be applied to colored pixels without going beyond the scope of the present invention, in which case a black pixel may be considered any pixel whose intensity is above a threshold.

First, a determining method when the setting value is "1" will be described with reference to FIG. 8. FIG. 8 is a diagram illustrating a data table to which the line width correction unit 203 refers to determine whether the line width correcting process is performed on the target pixel when the setting value is "1." The line width correction unit 203 determines that the target pixel is to be replaced with a black pixel (subjected to line width correcting process), when one pixel of the first determination pixels is O, one pixel of the second determination pixels is O, and the target pixel is x, as in FIG. 8. Otherwise, the line width correction unit 203 determines that the target pixel is not to be replaced with a black pixel (not subjected to line width correcting process).

For example, it is considered that the line width correcting process is performed on a graphic element "\" (all pixels forming "\" are black pixels), as in FIG. 9. Each of [1] and [2] indicates a positional relation of the first determination pixels (□) and the second determination pixels (◉) with respect to the target pixel (Δ). In both [1] and [2], since the target pixel is a white pixel and the correction flag is not added, the target pixel (Δ) is x. In the case of [1], since the first determination pixels (□) located to the left of the target pixel (Δ) and the second determination pixel (◉) located left below the target pixel (Δ) are black pixels, the first and second determination pixels are O. The line width correction unit 203 determines that the target pixel is to be replaced with a black pixel (subjected to line width correcting process). On the other hand, in the case of [2], since both two first determination pixels (□) are not black pixels, the first determination pixels are x. Therefore, the line width correction unit 203 determines that the target pixel is not to be replaced with a black pixel (not subjected to line width correcting process).

Next, a determining method when the setting value is "2" will be described. In this case, when at least one pixel of the first determination pixels is a black pixel and the target pixel is a black pixel to which the correction flag is not added, the line width correction unit 203 determines that the line width correcting process is performed on the target pixel. Otherwise, the line width correction unit 203 determines that the line width correcting process is not performed on the target pixel.

The flowchart is referred back for the description.

When the line width correction unit 203 determines that the line width correcting process is not performed (No in step S405), the line width correcting process on the target pixel ends. Conversely, when the line width correction unit 203 determines that the line width correcting process is performed (Yes in step S405), then in step S406, the line width correction unit 203 replaces the target pixel with a black pixel by substituting the pixel value of the target pixel with a pixel value (density value) of the first determination pixel.

In step S407, the line width correction unit 203 adds, to the target pixel, the correction flag indicating that the target pixel is replaced with the black pixel through the line width correcting process.

In step S408, the line width correction unit 203 determines whether the line width correcting process has been undergone on all pixels. When all pixels have undergone the process, the line width correcting process ends. Conversely, when all pixels have not yet undergone the process, then in step S409, the line width correction unit 203 shifts the target pixel, that is, sets the processing target pixel of the line width correcting process as an unprocessed pixel and repeats the processes of steps S405 to S408.

Hereinafter, the correction filter for the setting value "1", which is one of the characteristics of the exemplary embodiment, will be described in detail.

The first determination pixels are set at positions adjacent to the target pixel in the upper, lower, left, and right directions and are referred to so as to determine whether pixel data is added to the target pixel. The positions of the first determination pixels for realizing the line width correcting process in the exemplary embodiment is described in detail. The number of first determination pixels is two. One of the first determination pixels is one of the pixels adjacent to the target pixel in a vertical direction. The other of the first determination pixels is one of the pixels adjacent to the target pixel in a horizontal direction. The directions in which the two first determination pixels are present are perpendicular to each other, as seen from the target pixel.

The second determination pixels are set at positions adjacent to the target pixel in a diagonal direction and are referred along with the determination result obtained using the first determination pixels to determine whether pixel data is added to the target pixel. The positions of the second determination pixels for realizing the line width correcting process in the exemplary embodiment is described in detail. The number of second determination pixels is two. One of the second determination pixels is a pixel (pixel "a") which is adjacent to the two first determination pixels and is not the target pixel. The other of the second determination pixels is a pixel that is adjacent to one of the two first determination pixels, with the pixel "a" being therebetween. In other words, the second determination pixels are two pixels adjacent to and opposite across one of the two first determination pixels. An example of the setting of the first and second determination pixels described above is illustrated in FIG. 7A.

Figure 10A:
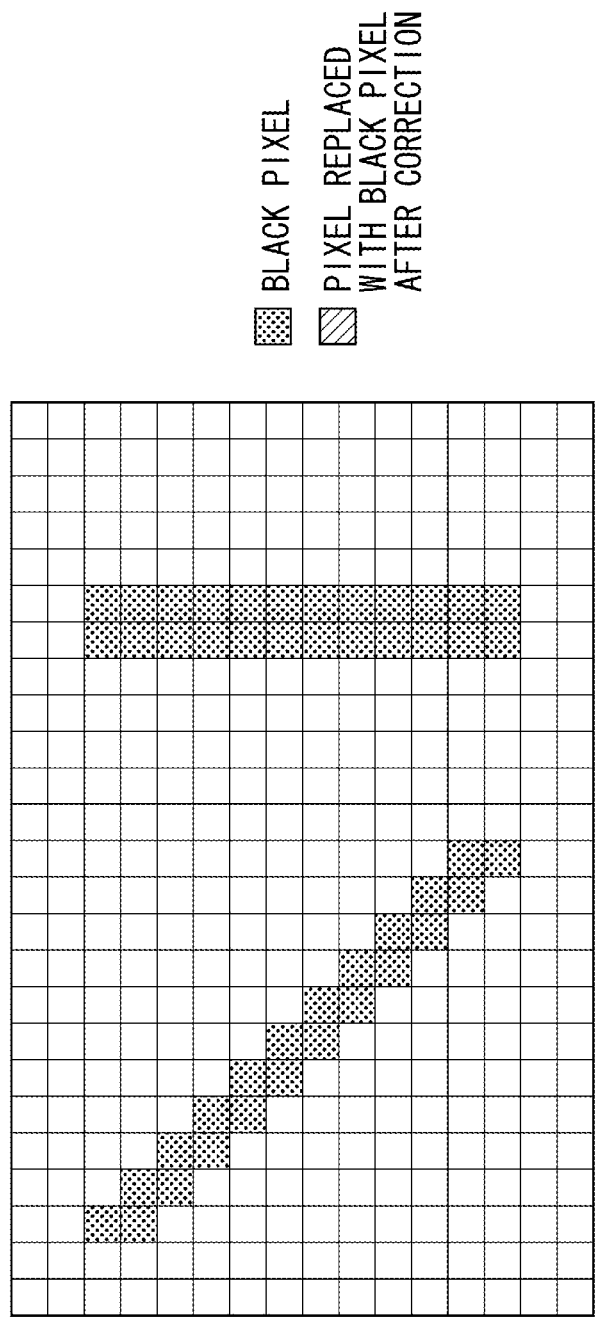

When the line width correcting process is performed on the graphic elements "\" and "|" illustrated in FIG. 10A according to the method of the line width correcting process described above, the elements "\" and "|" are thickened and replaced with the black pixels for one pixel each, as in FIG. 10B. At this time, when the correction amount for each of the graphic elements "\" and "|" is seen in the horizontal direction of FIG. 10B, the correction amount for each element is for one pixel. That is, in the line width correcting process according to the conventional technology, the correction amount is varied depending on the angle of the element, as illustrated in FIG. 15B. However, in the line width correcting process according to the exemplary embodiment, the correction amount is uniform irrespective of the angle of the element.

According to the exemplary embodiment, as described above, the line width can be corrected with a uniform correction amount by referring to not only the first determination pixels adjacent to the target pixel but also the second determination pixels in the line width correcting process (pixel replacement with black pixels) on the target pixel.

Figure 7C:
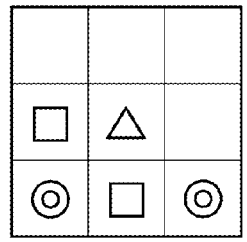

In addition, as described above, the first and second determination pixels have hitherto been described with reference to FIG. 7A, but the present invention is not limited thereto. A filter of 3×3 pixels illustrated in FIG. 7C may be used. Further, a filter rotated from the filter illustrated in FIG. 7A or the filter illustrated in FIG. 7C by a rotation angle such as 90 degrees, 180 degrees, 270 degrees, or the like may be used.

Further, the present invention is not limited to the method for evaluating the first and second determination pixels depending on whether these pixels are black pixels and determining whether the line width correcting process is performed on the target pixel. For example, when the first and second determination pixels are evaluated, the first and second determination pixels may be evaluated based on an index indicating whether the densities of the pixels are equal to or greater than 80%, rather than the index indicating whether the pixels are black pixels with the density of 100%.

The line width correcting process described in the exemplary embodiment may be applied only to an object having attribute data of a character or a graphic. In this case, in the process in step S405, the line width correction unit 203 performs a process for determining whether to perform the above-described line width correcting process, when the attribute data is a character or a graphic with reference to the attribute data of a processing target pixel. By configuring the line width correction unit 203 in this way, an image quality through the line width correcting process on a character or a graphic can be improved, while suppressing image deterioration that can be noticeable due to part of pixels in a photo that is replaced with black pixels.

The image processing apparatus according to the first exemplary embodiment determines whether the line width correcting process is performed on the target pixel, referring to the first and second determination pixels, and performs the line width correcting process with a uniform width. In the first exemplary embodiment, when a blank (white pixel) corresponding to one pixel is present in, for example, a character (Chinese character or the like) in a small size, or a mark or graphic formed by fine lines and the target pixel is a blank pixel, the white pixel is replaced with a black pixel and the blank may be lost in some cases.

Figure 11A:
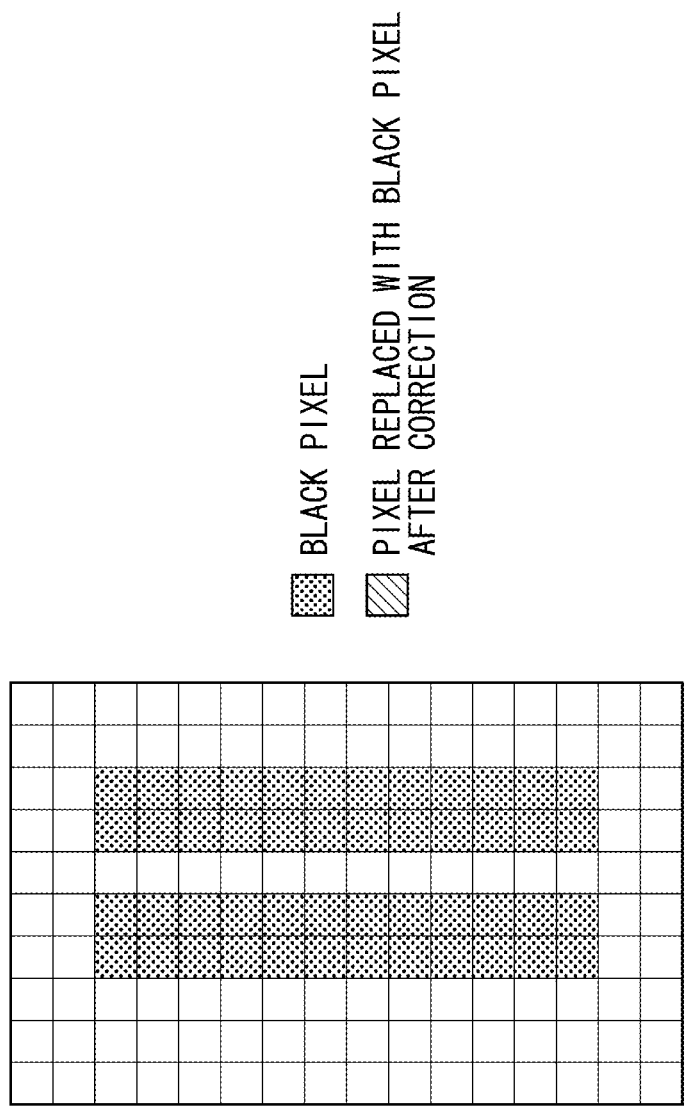
FIGS. 11A, 11B, and 11C are diagrams illustrating an example in which a blank is lost according to a second exemplary embodiment.
Figure 11B:
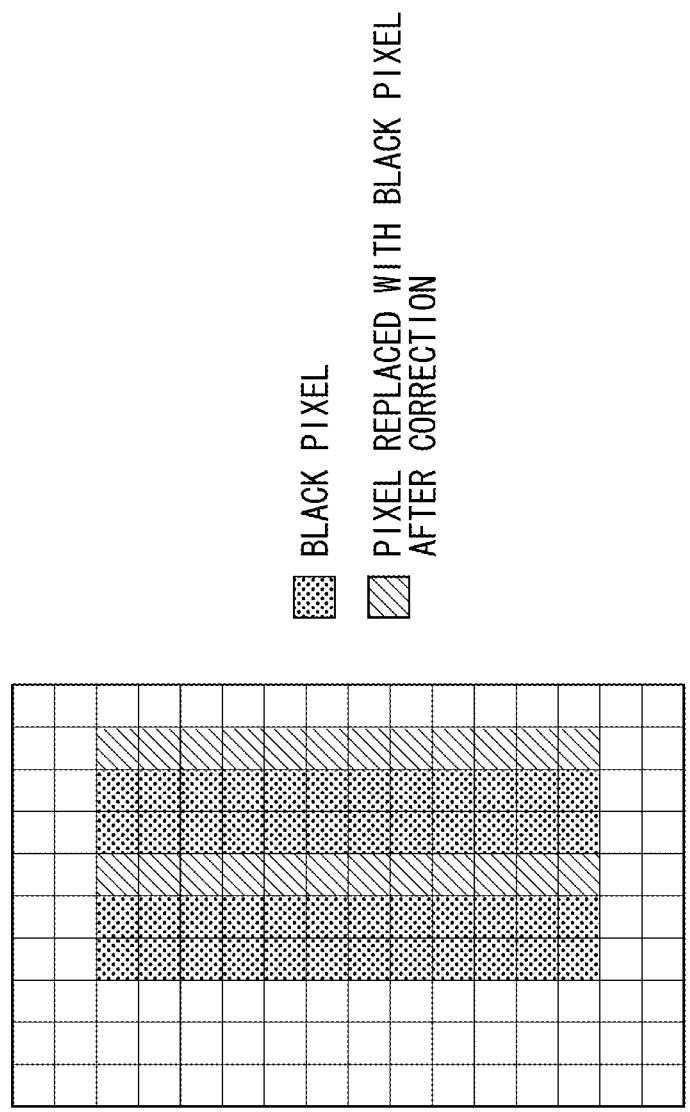

In FIG. 11A, elements "|" of vertical lines are disposed left and right with a blank of one pixel therebetween. When the processing flow of FIG. 3 described in the first exemplary embodiment is applied to the two elements, the line width of each element is corrected to be thickened, as in FIG. 11B. Here, as illustrated in FIG. 11B, a gap (blank) of one pixel in FIG. 11A is replaced with a black pixel, and thus become an element of the one thick vertical line. As a result, since the two vertical lines are turned to one line, visual impression may be considerably different.

According to a second exemplary embodiment of the invention, a method for performing a line width correcting process while preventing a blank from being lost will be described. In the exemplary embodiment, the similar configuration to that of the first exemplary embodiment is used, if otherwise not mentioned, and the configuration will not be described.

FIG. 4 is a diagram illustrating a detailed processing flow in step S306 performed by the line width correction unit 203 according to the second exemplary embodiment. In the flowchart in FIG. 4, the same processes as those of the corresponding steps in the flowchart of FIG. 3 are performed in the same step numbers as those in FIG. 3. Specifically, the characteristic of the line width correcting process according to the exemplary embodiment is in a process in step S504. Hereinafter, this process will be described.

In step S504, the line width correction unit 203 determines whether the target pixel is a blank pixel. When the target pixel is the blank pixel, the process proceeds to step S408. Otherwise, the process proceeds to step S405. In this process, the line width correction unit 203 functions as a blank pixel determination unit that determines whether the target pixel is a blank pixel being between black pixels.

Figure 12A:
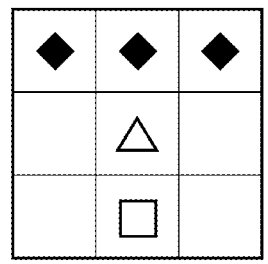
FIGS. 12A and 12B are diagrams illustrating blank determination filters according to the second exemplary embodiment.
Figure 12B:
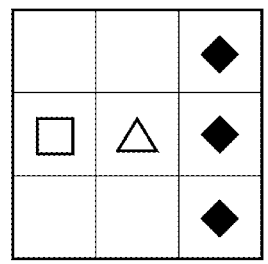

A method of the determining process in step S504 will be described with reference to FIGS. 12A and 12B on the assumption that pixels located below a target pixel by one pixel and to the left of the target pixel by one pixel are set as the first determination pixels, as in the first exemplary embodiment. Filters illustrated in FIGS. 12A and 12B are blank pixel determination filters of 3×3 pixels used to determine a blank pixel. Marks Δ and □ in the blank pixel determination filters respectively indicate the target pixel and the first determination pixel, as in the first exemplary embodiment. Three pixels lined opposite to the first determination pixel (□) with the target pixel being therebetween are blank pixel determination pixels (♦). Thus, it can be understood that the blank pixel determination pixels are three pixels located opposite to the first determination pixel among eight pixels around the target pixel with the target pixel being therebetween, and at least one blank pixel determination pixel is adjacent to the target pixel.

In step S504, the line width correction unit 203 determines that the target pixel is the blank pixel, when the first determination pixel of the blank pixel determination filters in FIGS. 12A and 12B is a black pixel and at least one of the blank pixel determination pixels is a black pixel.

Figure 11C:
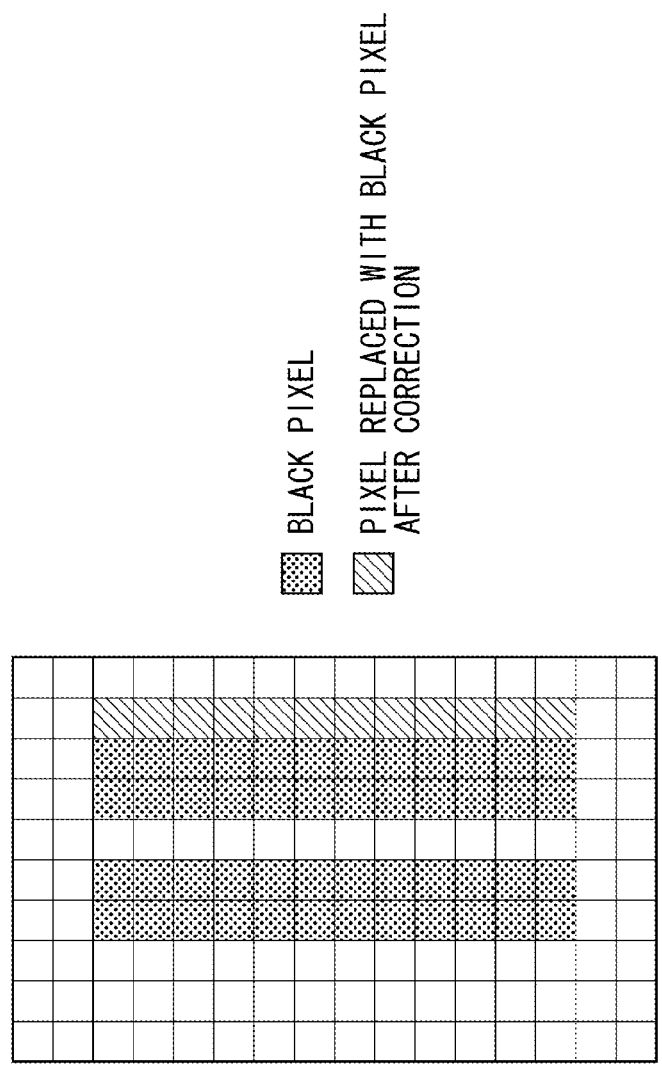

Thus, when the line width correcting process is performed on the graphic element illustrated in FIG. 11A according to the method of the line width correcting process according to the above-described exemplary embodiment, as illustrated in FIG. 11C, the gap (blank pixels between vertical lines) is not replaced with black pixels and pixel replacement with black pixels is performed with two vertical lines kept separate. Thus, according to the exemplary embodiment, the line width correcting process can be performed without losing blank pixels originally included in an image such as a graphic or a character.

As described above, the image processing apparatus according to the exemplary embodiment sets the blank pixel determination pixels, determines whether the target pixel is a blank pixel, and determines whether to perform the line width correcting process on the target pixel. Thus, an image such as a character or a graphic can be thickened by performing the line width correcting process, while maintaining blank pixels input intentionally by a user.

The blank pixel determination filter having the blank pixel determination pixels described in the exemplary embodiment is merely an example. Any setting position of the blank pixel determination pixel and any size of the blank pixel determination filter can be set, as long as it can be determined that the target pixel, which is the processing target pixel, is a blank pixel being between black pixels.

Figure 13A:
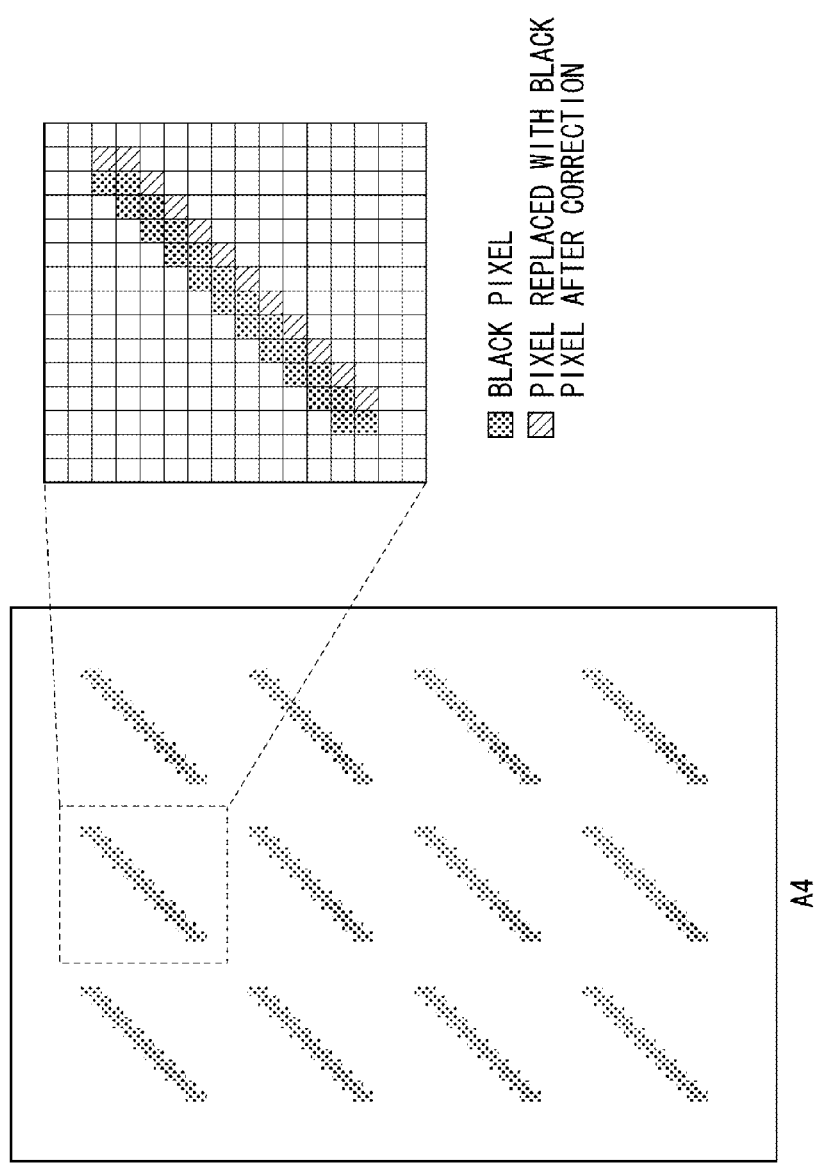
FIGS. 13A and 13B are diagrams illustrating rotation examples of image data according to a third exemplary embodiment.
Figure 13B:
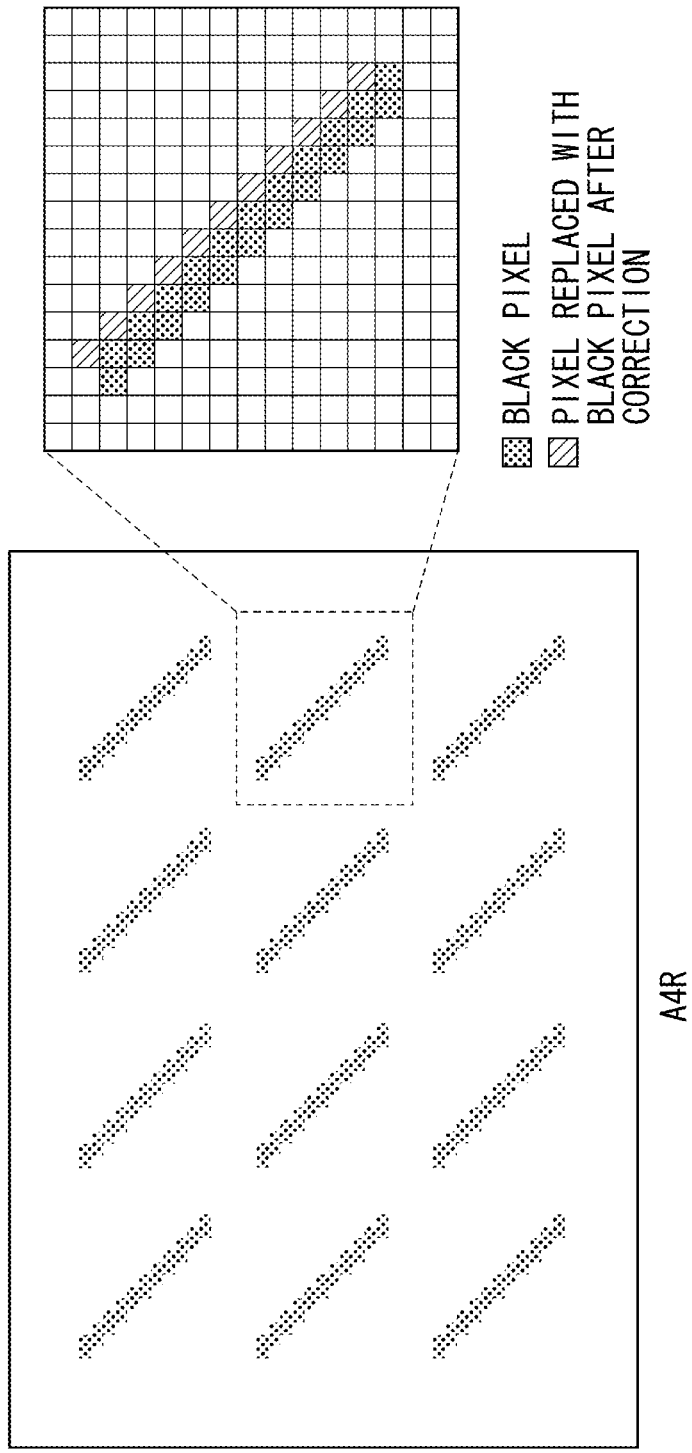

The printer image processing unit 107 outputs an image subjected to image processing to the printer unit 108. At this time, the printer image processing unit 107 performs image processing by rotating the image in the direction of a sheet conveyed to the printer unit 108 and outputs the rotated image to the printer unit 108. Specifically, when a sheet is conveyed to the printer unit 108 in the similar direction to the direction of the image (A4 portrait orientation) in printing of an A4 image illustrated in FIG. 13A, the printer image processing unit 107 performs image processing without rotating the input image. On the other hand, when the sheet is conveyed to the printer unit 108 in the state rotated clockwise by 90 degrees with respect to the image (A4R landscape orientation), the printer image processing unit 107 accordingly rotates the image in FIG. 13A clockwise by 90 degrees. Then, the printer image processing unit 107 performs image processing such as the line width correcting process on the rotated image illustrated in FIG. 13B.

When the line width correcting method described in the first exemplary embodiment is applied to the printer image processing unit 107, a direction of pixel replacement with a black pixel by the line width correcting process may be different depending on whether the image is in the A4 portrait state or the A4R landscape state. Specifically, when line width correcting process is performed using the correction filter in FIG. 7A, the direction of pixel replacement with black pixels is a rightward direction in the image in the A4 portrait state and the A4R landscape state illustrated in FIGS. 13A and 13B, respectively (see right drawings in FIGS. 13A and 13B). However, when the image-printed sheet in the A4R landscape state in the printing direction thereof is laid on the image-printed sheet in the A4 portrait state in the printing direction thereof, and then two print products are seen, it can be understood that the directions of pixel replacement with black pixels are different with respect to the original image. More specifically, when the graphic element "/" is subjected to the line width correcting process and is printed, an image in which the element "/" is thickened rightward is printed in one of the print products and an image in which the element "/" is thickened leftward is printed in the other of the print products. That is, the line width correcting method described in the first exemplary embodiment does not ensure isotropy of an image subjected to the line width correcting process on a print product. Therefore, even when the similar image is attempted to be printed, the shape of the image subjected to the line width correcting process may be changed in the conveyance direction of the sheet, and thus the visual impression may be changed between a plurality of print products.

According to a third exemplary embodiment of the invention, a line width correcting process ensuring isotropy of an image on a print product will be described, even when the image is rotated at the time of line correction correcting process, as in the A4 portrait state or the A4R landscape state. The configuration of the exemplary embodiment is assumed to similar to the configuration of the first exemplary embodiment, if otherwise mentioned, and the similar configuration will not be described.

FIG. 5 is a diagram illustrating a detailed processing flow in step S306 performed by the line width correction unit 203 according to the third exemplary embodiment. In the flowchart illustrated in FIG. 5, the same processes as those of the corresponding steps in the flowchart illustrated in FIG. 3 are performed in the same step numbers as those in FIG. 3. That is, the characteristic of the line width correcting process according to the exemplary embodiment is in processes in steps S601 and S603. Hereinafter, this process will be described.

In step S601, the line width correction unit 203 acquires a setting value from the HDD 104, as in step S401. Then, the line width correction unit 203 acquires rotation direction data indicating the degree of the rotation of an image in the PDL processing unit 201 via the printer color processing unit 202.

Figure 14:
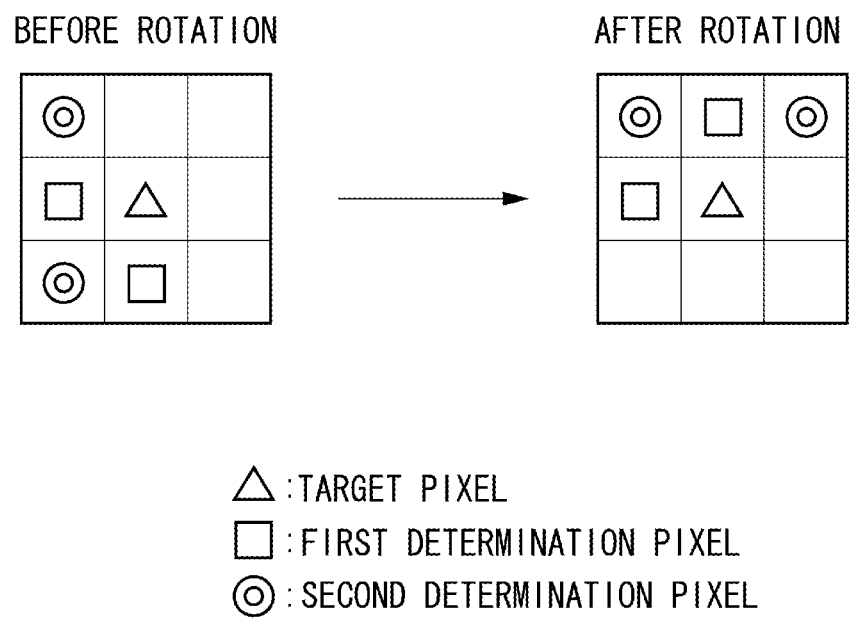
FIG. 14 is a diagram illustrating correction filters according to the third exemplary embodiment.

In step S603, the line width correction unit 203 sets a correction filter based on the setting value and the rotation direction data acquired in step S601. In the setting of the correction filter, the line width correction unit 203 first sets the correction filter (see FIGS. 7A, 7B, and 7C) based on the setting value, as in the first exemplary embodiment. Next, the line width correction unit 203 performs a rotating process on the set correction filter only to the degree similar to the degree of rotation indicated by the rotation direction data and sets the rotated correction filter as a correction filter to be used in the line width correcting process of the exemplary embodiment. Specifically, when the setting value is "1," the line width correction unit 203 sets the correction filter illustrated in FIG. 7A as in the first exemplary embodiment. When the rotation direction data indicates a clockwise rotation of 90 degrees (A4R landscape orientation), the line width correction unit 203 rotates the set filter in the left drawing of FIG. 14 clockwise by 90 degrees to convert the filter into a filter in the right drawing and sets the rotated filter as a correction filter. When the correction filter is rotated in the setting value of "2," the filter is not changed from the filter before rotation. Therefore, when the setting value is "2," the process for rotating the correction filter may not be performed.

As described, the image processing apparatus according to the exemplary embodiment rotates the correction filter to match the rotation of an image in the printer image processing unit 107. Thus, even when the line width correcting process is performed after the process for rotating an image, the line width correcting process can be performed, while ensuring the isotropy of the image on a print product. This can prevent difference in shape of an image due to the line width correcting process, when a plurality of images such as characters or graphics is printed. Therefore, the line width correcting process can be performed without changes in the impression between a plurality of print products.

In the exemplary embodiment, the first and second determination pixels are rotated only by the angle similar to that of the rotation of the image data. However, the present invention is not limited thereto. Any position of the first and second determination pixels can be set for the rotation of the image data.

The configuration of the correction filter rotation, which is one of the characteristics of the exemplary embodiment, may be combined with the image processing apparatus according to the second exemplary embodiment. In this case, the advantage in the second exemplary embodiment can be achieved in addition to the advantage in the third exemplary embodiment.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., non-transitory computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-272165 filed Dec. 13, 2011, which is hereby incorporated by reference herein in its entirety.

What is claimed is:

1. An image processing apparatus comprising:
an acquiring unit configured to acquire information for controlling a degree of pixel replacement with a black pixel;
a setting unit configured to set, in a case where the acquired information is first information, two pixels, one of which is adjacent to a processing target pixel in a vertical direction and the other of which is adjacent to the processing target pixel in a horizontal direction, as first determination pixels, and two pixels adjacent to and opposite across one of the two first determination pixels as second determination pixels, and to set, in a case where the acquired information is second information, four pixels, each being adjacent to the processing target pixel as the first determination pixels; and
a replacing unit configured to replace the processing target pixel with a black pixel, in a case where the acquired information is the first information, one of the first determination pixels is a black pixel and one of the second determination pixels is a black pixel, and to replace the processing target pixel with a black pixel in a case where the acquired information is the second information and one of the first determination pixels is a black pixel,
wherein the second information indicates the pixel replacement with a black pixel is performed to a degree larger than a degree of pixel replacement with a black pixel indicated by the first information.

2. The image processing apparatus according to claim 1, wherein the setting unit performs the setting on a filter of 3×3 pixels around the processing target pixel, and wherein the output unit outputs the black pixel using the set filter.

3. The image processing apparatus according to claim 1, further comprising:
a blank pixel determination unit configured to determine whether the processing target pixel is a white pixel being between black pixels, wherein,
in a case where the blank pixel determination unit determines that the processing target pixel is a white pixel being between black pixels, the replacing unit does not replace the processing target pixel with a black pixel, and wherein,
in a case where the blank pixel determination unit determines that the processing target pixel is not a white pixel being between black pixels, the replacing unit replaces the processing target pixel with a black pixel.

4. The image processing apparatus according to claim 1, wherein the setting unit acquires rotation information indicating a degree of rotation of the image including the processing target pixel and resets the first and second determination pixels at positions of pixels rotated from the set first and second determination pixels with respect to a target pixel to a degree similar to the degree of rotation indicated by the acquired rotation information.

5. The image processing apparatus according to claim 1, wherein the replacing unit replaces the processing target pixel with a black pixel, in a case where an attribute of the processing target pixel includes a character or a graphic.

6. The image processing apparatus according to claim 1, further comprising:
a first pixel determination unit configured to determine whether the processing target pixel is in a first category of pixels that are not modified by the image processing apparatus or a second category of pixels which may be modified by the image processing apparatus,
the first pixel determination unit associates each first determination pixel with a group of blank pixel determination pixels, the group of blank pixel determination pixels are those pixels which are opposite each first determination pixel,
for each first determination pixel, in a case in which the first determination pixel is black and one of the blank determination pixels associated with the first determination pixel is also black then the processing target pixel is in the first category of pixels which are not modified, otherwise the processing target is processed by the replacing unit.

7. The image processing apparatus according to claim 6, wherein the group of blank pixel determination pixels includes:
a first blank pixel determination pixel that is adjacent to the processing target pixel and opposite the first determination pixel across the processing target pixel;
a second blank pixel determination pixel that is adjacent to the first blank pixel determination pixel processing target pixel and a corner of the second blank pixel determination pixel is adjacent to a first corner of the processing target pixel;
a third blank pixel determination pixel that is adjacent to the first blank pixel determination pixel processing target pixel and a corner of the third blank pixel determination pixel is adjacent to a second corner of the processing target pixel.

8. The image processing apparatus according to claim 1, wherein a pixel is considered black if an intensity of the pixel is above a threshold.

9. The image processing apparatus according to claim 1, wherein a degree of pixel replacement with a black pixel indicated by the first information corresponds to one pixel and a degree of pixel replacement with a black pixel indicated by the second information corresponds to two pixels.

10. An image processing method for replacing a processing target pixel of an image with a black pixel, the method comprising:
acquiring information for controlling a degree of pixel replacement with a black pixel;
in a case where the acquired information is first information, setting two pixels, one of which is adjacent to the processing target pixel in a vertical direction and the other of which is adjacent to the processing target pixel in a horizontal direction, as first determination pixels, and setting two pixels adjacent to and opposite across one of the two first determination pixels, as second determination pixels;
in a case where the acquired information is second information, setting four pixels, each adjacent to the processing target pixel as the first determination pixels;
replacing the processing target pixel with a black pixel and in a case where the acquired information is the second information and one of the first determination pixels is a black pixel, replacing the processing target pixel with a black pixel
wherein the second information indicates that pixel replacement with a black pixel is performed to a degree larger than a degree of pixel replacement with a black pixel indicated by the first information.

11. The image processing method according to claim 10, further comprising: performing the setting on a filter of 3×3 pixels around the processing target pixel, and outputting the black pixel using the set filter.

12. The image processing method according to claim 10, further comprising:
    determining whether the processing target pixel is a white pixel being between black pixels;
    not replacing the processing target pixel with a black pixel, in a case where the processing target pixel is determined to be a white pixel being between back pixels; and
    replacing the processing target pixel with a black pixel, in a case where the processing target pixel is not determined to be a white pixel being between black pixels.

13. The image processing method according to claim 10, further comprising: acquiring rotation information indicating a degree of rotation of the image including the processing target pixel and resetting the first and second determination pixels at positions of pixels rotated from the set first and second determination pixels with respect to a target pixel to a degree similar to the degree of rotation indicated by the acquired rotation information.

14. The image processing method according to claim 10, further comprising: replacing the processing target pixel with a black pixel, in a case where an attribute of the processing target pixel includes a character or a graphic.

15. A non-transitory computer-readable storage medium storing a program that causes a computer to execute an image processing method for replacing a processing target pixel of an image with a black pixel, the method comprising:
    acquiring information for controlling a degree of pixel replacement with a black pixel;
    in a case where the acquired information is first information, setting two pixels, one of which is adjacent to the processing target pixel in a vertical direction and the other of which is adjacent to the processing target pixel in a horizontal direction, as first determination pixels, and setting two pixels adjacent to and opposite across one of the two first determination pixels, as second determination pixels;
    in a case where the acquired information is second information, setting four pixels each being adjacent to the processing target pixel as the first determination pixels;
    replacing the processing target pixel with a black pixel and outputting the black pixel in a case where the acquired information is the first information, one of the first determination pixels is a black pixel and one of the second determination pixels is a black pixel, and
    replacing the processing target pixel with a black pixel in a case where the acquired information is the second information and one of the first determination pixels is a black pixel,
    wherein the second information indicates that pixel replacement with a black pixel is performed to a degree larger than a degree of pixel replacement with a black pixel indicated by the first information.

* * * * *